US010723071B2

(12) United States Patent
Fey

(10) Patent No.: US 10,723,071 B2
(45) Date of Patent: Jul. 28, 2020

(54) DEVICE AND METHOD FOR GENERATIVELY PRODUCING A THREE-DIMENSIONAL OBJECT

(71) Applicant: EOS GmbH Electro Optical Systems, Krailling (DE)

(72) Inventor: Georg Fey, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 504 days.

(21) Appl. No.: 15/615,122

(22) Filed: Jun. 6, 2017

(65) Prior Publication Data

US 2017/0348905 A1 Dec. 7, 2017

(30) Foreign Application Priority Data

Jun. 6, 2016 (DE) .......................... 10 2016 209 933

(51) Int. Cl.
*B29C 64/00* (2017.01)
*B33Y 10/00* (2015.01)
(Continued)

(52) U.S. Cl.
CPC .......... *B29C 64/153* (2017.08); *B22F 3/1055* (2013.01); *B28B 1/001* (2013.01);
(Continued)

(58) Field of Classification Search
CPC ......... B29C 64/00; B29C 64/10; B29C 64/15; B29C 64/153; B29C 64/30; B29C 64/39;
(Continued)

(56) References Cited

U.S. PATENT DOCUMENTS 6,193,922 B1    2/2001  Ederer
2004/0164436 A1*  8/2004  Khoshnevis ............ B28B 1/001
                                                    264/31
(Continued)

FOREIGN PATENT DOCUMENTS

DE         19715582 A1   10/1998
DE     102006030350 A1    1/2008
(Continued)

OTHER PUBLICATIONS

German Search Report for Application No. 10 2016 209 933.7, dated Jan. 23, 2017, 9 pages.

*Primary Examiner* — Jacob T Minskey
*Assistant Examiner* — Matthew Hoover
(74) *Attorney, Agent, or Firm* — Seyfarth Shaw LLP

(57) ABSTRACT

A method for producing a three-dimensional object (2, 10) and a boundary region (8, 9, 18) by layer-wise applying and solidifying of at least one building material, wherein the three-dimensional object (2, 10) is produced with a first generative production method on the basis of a first building material and the boundary region (8, 9, 18) is produced with a second generative production method, which is different from the first generative production method, on the basis of a second building material. The first generative production method comprises the steps:

Figure 1:
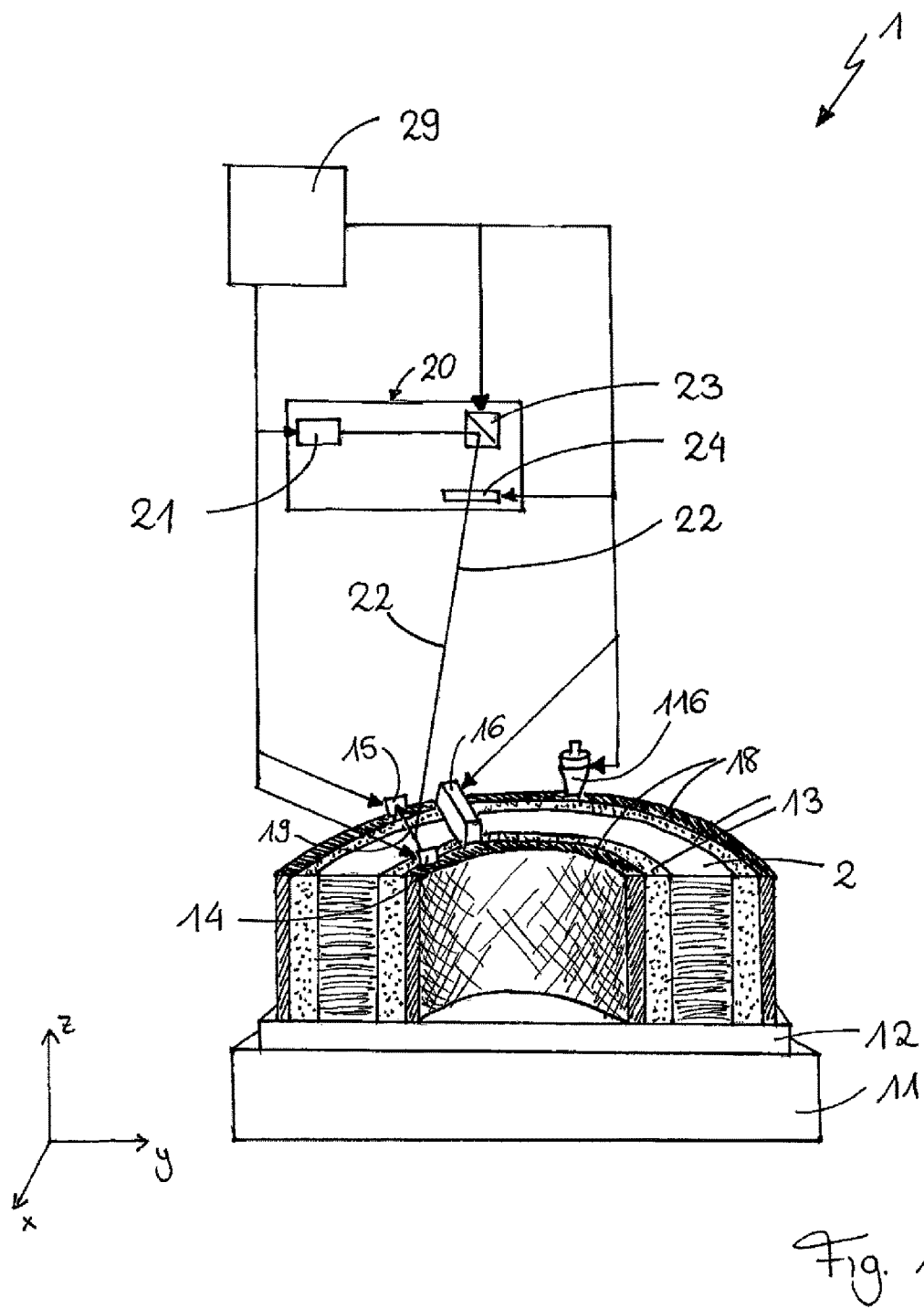

applying a layer of the first building material on a building base (11, 12) or on an already previously applied layer,
  selectively solidifying the applied layer at positions corresponding to the cross-section of the object (2, 10) in the respective layer and
  repeating the steps of applying and selectively solidifying until the object (2, 10) is completed.

(Continued)

The first and the second generative production method are carried out such that the boundary region (8, 9, 18) encloses the object (2, 10) at least partially.

10 Claims, 8 Drawing Sheets

(51) Int. Cl.
| | |
|---|---|
| *B33Y 30/00* | (2015.01) |
| *B22F 3/00* | (2006.01) |
| *B28B 1/00* | (2006.01) |
| *B29C 64/153* | (2017.01) |
| *B29C 64/40* | (2017.01) |
| *B29C 64/106* | (2017.01) |
| *B29C 64/393* | (2017.01) |
| *B29C 64/268* | (2017.01) |
| *B29C 64/165* | (2017.01) |
| *B22F 3/105* | (2006.01) |
| *B33Y 50/02* | (2015.01) |
| *B33Y 70/00* | (2020.01) |

(52) U.S. Cl.
CPC .......... *B29C 64/106* (2017.08); *B29C 64/165* (2017.08); *B29C 64/268* (2017.08); *B29C 64/393* (2017.08); *B29C 64/40* (2017.08); *B33Y 10/00* (2014.12); *B33Y 30/00* (2014.12); *B22F 2003/1057* (2013.01); *B33Y 50/02* (2014.12); *B33Y 70/00* (2014.12)

(58) Field of Classification Search
CPC ..... B29C 64/393; B29C 64/40; B29C 64/106; B29C 64/20; B29C 64/26; B29C 64/268; B29C 64/16; B29C 64/165; B33Y 10/00; B33Y 30/00; B22F 3/00; B22F 3/10; B22F 3/105; B22F 3/1055; B28B 1/00; B28B 1/001
See application file for complete search history.

(56) References Cited

U.S. PATENT DOCUMENTS

| | | | |
|---|---|---|---|
| 2008/0001331 A1* | 1/2008 | Ederer | .............. B29C 64/165 |
| | | | 264/460 |
| 2014/0306379 A1 | 10/2014 | Hartmann et al. | |
| 2014/0349132 A1* | 11/2014 | Uhlmann | .............. B22F 3/1055 |
| | | | 428/596 |

FOREIGN PATENT DOCUMENTS

| | | |
|---|---|---|
| DE | 102006026756 B4 | 6/2009 |
| DE | 102011111498 A1 | 2/2013 |
| DE | 102011089194 A1 | 6/2013 |
| EP | 0529816 | 3/1993 |
| EP | 0737130 B1 | 10/1996 |
| EP | 3053720 | 8/2016 |

\* cited by examiner

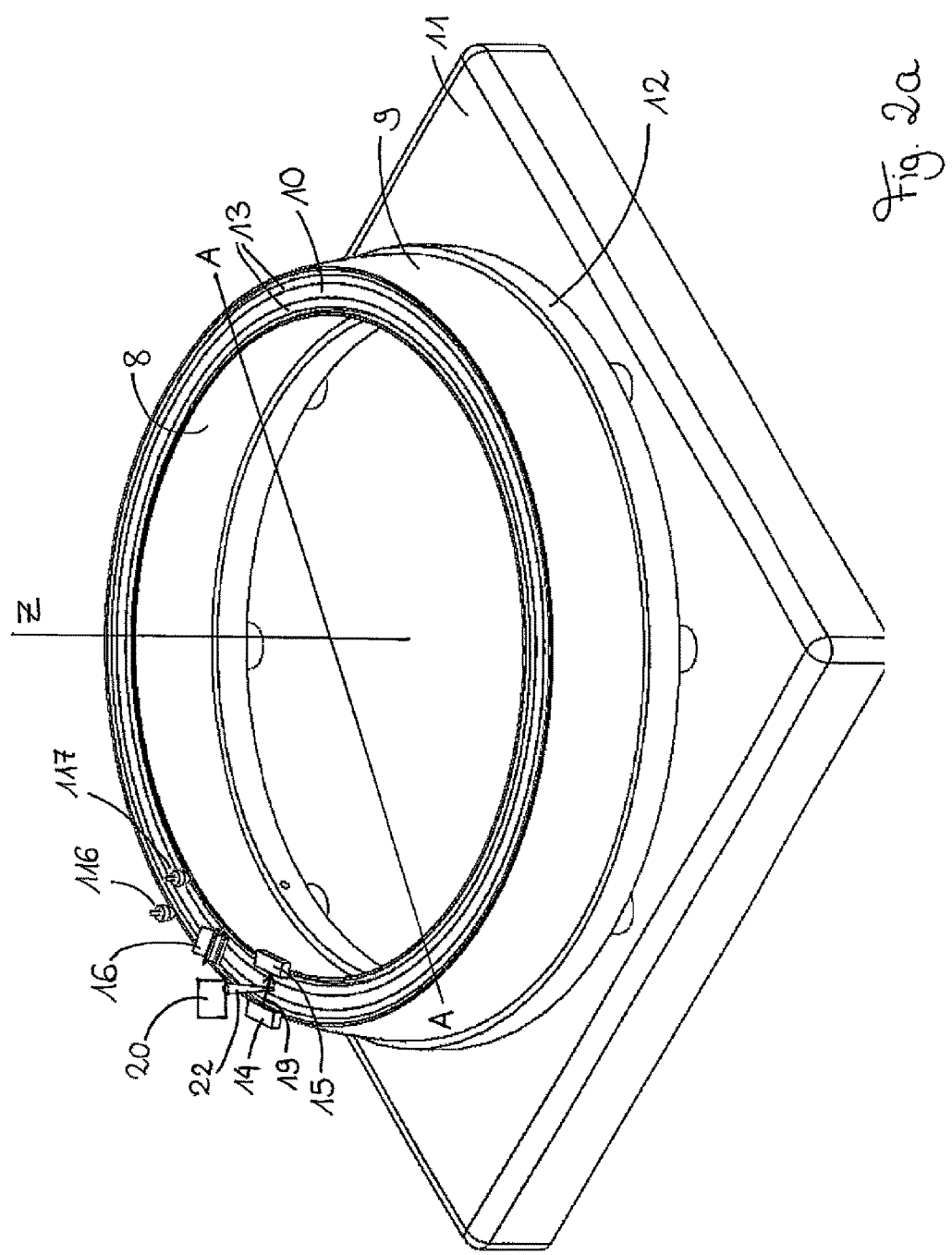

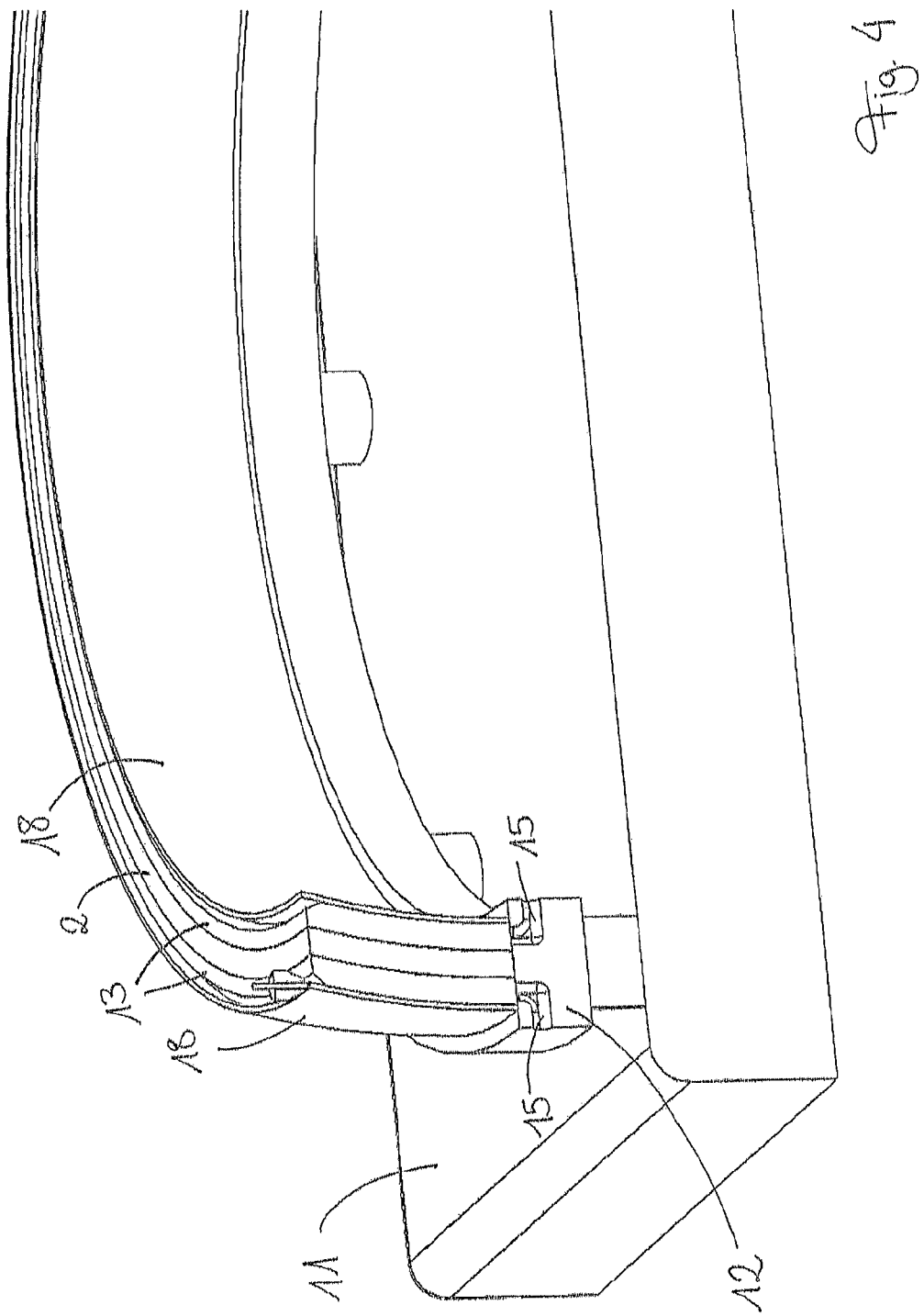

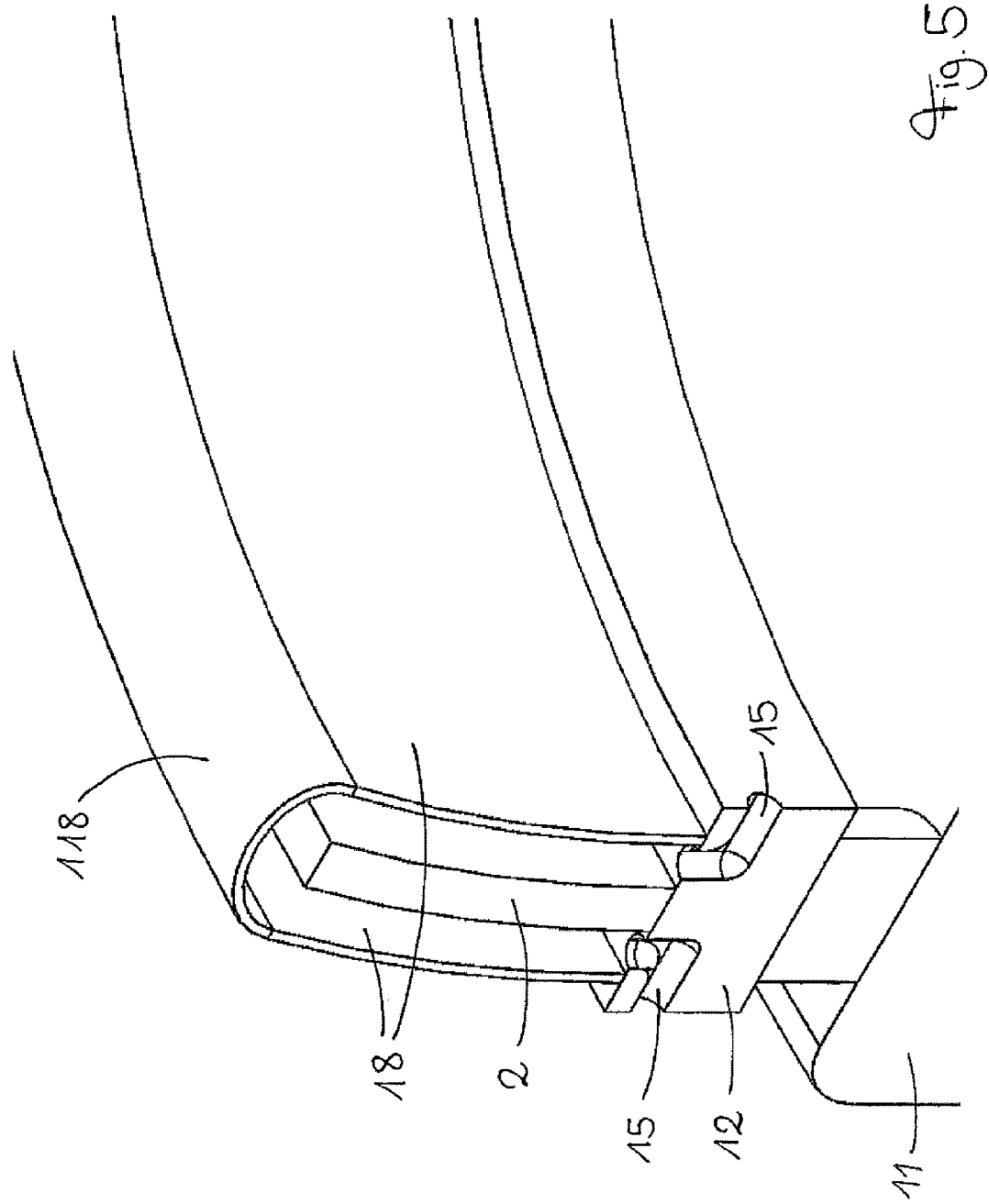

DEVICE AND METHOD FOR GENERATIVELY PRODUCING A THREE-DIMENSIONAL OBJECT

TECHNICAL FIELD OF THE INVENTION

The present invention relates to a device and a method for generatively producing a three-dimensional object by layer-wise applying and selectively solidifying a building material, preferably a powder.

BACKGROUND OF THE INVENTION

Devices and methods of this type are, for example, used for rapid prototyping, rapid tooling or additive manufacturing. An example of such a method is known by the name "selective laser sintering or laser melting". Therein, a thin layer of a pulverulent building material is repeatedly applied and the building material is in each layer selectively solidified by selectively irradiating with a laser beam.

Such a method is, for example, known from EP 0 737 130 B1. In this method, a pulverulent building material is layer-wise selectively solidified in such a way, that together with the object a container wall enclosing the object is produced. The object built in such a manner can, after completion, together with the unsolidified powder surrounding it, be removed from the device in the container.

Furthermore, in DE 102006026756 B4 a method for producing big molded objects is described, wherein two boundary walls of the molded object are produced first and the intermediate space is then filled with material. The generation of the walls thereby takes place by material output at a nozzle.

SUMMARY OF THE INVENTION

The object of the present invention is to provide an alternative, respectively improved, device and an alternative, respectively improved, method for generatively producing a three-dimensional object by layer-wise applying and selectively solidifying a building material. In particular, the invention aims at carrying out the production of such an object, particularly for example of an object having large dimensions, in a cost effective and/or time efficient way.

The method according to the invention is applicable for producing a three-dimensional object and a boundary region by layer-wise applying and solidifying of at least one building material. In the method, the three-dimensional object is produced with a first generative production method on the basis of a first building material and the boundary region with a second generative production method, which is different from the first generative production method, on the basis of a second building material. Therein, the first generative production method comprises the steps:
  applying a layer of the first building material on a building base or on an already previously applied layer,
  selectively solidifying the applied layer at positions corresponding to the cross-section of the object in the respective layer and
  repeating the steps of applying and selectively solidifying until the object is completed.

The first and the second generative production method are carried out such that the boundary region encloses the object at least partially.

The boundary region is an object that is separate from the object to be built. It limits a building space in which the object to be produced is built, for example to a simple geometrical structure, which comprises a maximum dimension of the object. The boundary region can be separated from the object in the manner of a formwork and preferably be removed from it without residue after the production process. The boundary region can be produced by an additive production method of the narrower sense or can be built layer-wise from, for example, prefabricated segments, which in turn can consist of smaller building blocks. In the context of the invention, the term "generative production method" thus also includes the case in which a plurality of elements which themselves have not been produced by a generative production method, for example by a casting or milling method, are combined into a boundary region. The shaping of the boundary region is consequently effected by a layer-wise or modular joining of formed volume elements. The shape of the boundary region or its individual elements is typically predetermined by a CAD model.

According to the invention, a connection between the segments or modules of the boundary region does not necessarily have to be made by gluing, caking or fusing, but can also be designed according to the principles of a force fit (non-positive fit) and/or a form fit (positive fit). Furthermore, the production of the segments or modules does not exclude the use of a shaping tool for this purpose.

"To enclose partially" refers to the boundary region enclosing the object in at least two spatial directions, wherein said enclosing refers to one as well as multiple layers or randomly selected cross-sections of the object, preferably to all layers or cross-sections. The object can as well be enclosed by the boundary region in all three spatial directions, wherein analogously also a partially three-dimensional or entire enclosing of the object is to be understood. However, "enclosing" does not mean that all exterior surfaces of the object directly adjoin the boundary region. Rather, unsolidified first building material can also be located at an intermediate space between the object and the boundary region.

Thereby it is, for example, possible to carry out the layer-wise material application of the first building material at least partially within an area bounded by the boundary region. This leads, among other things, in particular in the case of large objects to be produced, to the amount of building material to be supplied for the object being able to be reduced and the production time to be reduced, which renders the manufacturing process more time and cost-efficient.

Preferably, the first generative production method differs from the second generative production method in that the application of the first and the second building material is carried out with different methods and/or the solidification of the first and the second building material is carried out with different methods. Thereby, for example, the boundary region can be produced with a faster production method (in particular faster than the first production method) without adversely affecting the quality of the object.

Preferably, the second generative production method comprises the following steps:
  selectively applying a layer of the second building material on a building base or on a previously applied layer at positions corresponding to the cross-section of the boundary region in the respective layer,
  solidifying the applied layer and
  repeating the steps of selectively applying and solidifying until the boundary region is completed.

Thereby it is, for example, possible to produce the boundary region in a simple and fast manner.

In principle, it is possible for the first and the second building material to be alike, i.e. identical. Preferably, the first and the second building material are different. Thereby it is, for example, possible to use a cost-efficient and/or a quickly to be processed second building material (in particular compared to the first building material) for producing the boundary region.

Preferably, the first generative production method and the second generative production method are carried out at least temporarily simultaneously or alternately. This, for example, speeds up the manufacturing process of the object, as long waiting periods are largely omitted.

Preferably, the first and the second generative production method are carried out such that the boundary region substantially encloses the object completely in at least two spatial directions, preferably in a layer-parallel x- and a layer-parallel y-direction. As a result, it is, for example, possible to confine the application of each layer of the first building material, from which the object is built, to an area as small as possible.

Preferably, the application of a layer of the first building material according to the first generative production method is carried out substantially exclusively in an area bounded by the boundary region. The boundary region can thus, for example, form a building container for the object to be built and the application of material of a layer of the second building material is therefore carried out spatially confined in an area within the boundary region. Thus, for example, the required amount of first building material can be reduced.

Preferably, after completion, the three-dimensional object is removed from the boundary region and/or the boundary region is removed from the object. Thus, the manufactured object can, for example, be subjected to a subsequent treatment.

Preferably, the first generative production method comprises a powder bed-based method using a source of electromagnetic radiation or particle radiation and/or the second generative production method comprises a non-powder bed-based method, in particular a fused deposition modeling method. Thus, for example, the object can be produced in good quality and high detail precision, whilst the bounding area can be produced cost-effectively and time-efficiently. With this, a fused deposition modeling method allows, for example, for the boundary region to be built freely, i.e. without enclosure.

According to the invention, a device for producing a three-dimensional object and a boundary region by layer-wise applying and solidifying at least one building material is configured to produce the three-dimensional object with a first generative production method on the basis of a first building material and to produce the boundary region with a second generative production method, which is different from the first generative production method, on the basis of a second building material. Therein, the device for carrying out the first generative production method comprises a first application device which, during operation, applies a layer of the first building material on a building base or on an already previously applied layer, and a first solidification device which, during operation, carries out a selective solidification of the applied layer at positions corresponding to the cross-section of the object in the respective layer. Furthermore, the device is configured to repeat the steps of applying and selectively solidifying until the object is completed. The device, during operation, carries out the first and the second generative production method such that the boundary region encloses the object at least partially. Thereby, for example, a device is provided, with which the method according to the invention can be carried out.

Preferably, the device comprises at least a second application and/or solidification device for applying and/or solidifying the second building material according to the second generative production method. As a result, it is, for example, possible to carry out application of the material and/or the solidification of the first and second building material at substantially the same time.

Preferably, the device comprises at least one suction device. Thereby, for example, resulting byproducts of the process, such as spatters, fumes and vapors, can be deflected from the solidification area by a gas flow.

Preferably, the application device(s) and/or the solidification device(s) and/or the suction device(s) are movably arranged in the device. As a result, for example, the application of the material and/or the (selective) solidification of the material and/or the suction of resulting byproducts of the process can be carried out in parallel, i.e. simultaneously at different locations.

In principle it is possible for the device to comprise a single building base for building the three-dimensional object. Preferably, the device comprises a first building base for building the three-dimensional object and also at least a second building base for building the boundary region. As a result, it is, for example, possible to build the object directly on the first building base for improved stability, with the result that the building material upon solidification adheres to it and the object to be produced is connected to it.

A control unit for a device according to the invention is configured and/or programmed to control the device such that it is suited to carry out a method according to the invention. Thereby, for example, a control unit is provided which is capable of controlling a device for producing a three-dimensional object in such a way that it automatically carries out the method according to the invention.

Further features and expediencies of the invention are set out in the description of exemplary embodiments with the aid of the attached drawings.

DETAILED DESCRIPTION OF THE EMBODIMENTS

Figure 2B:
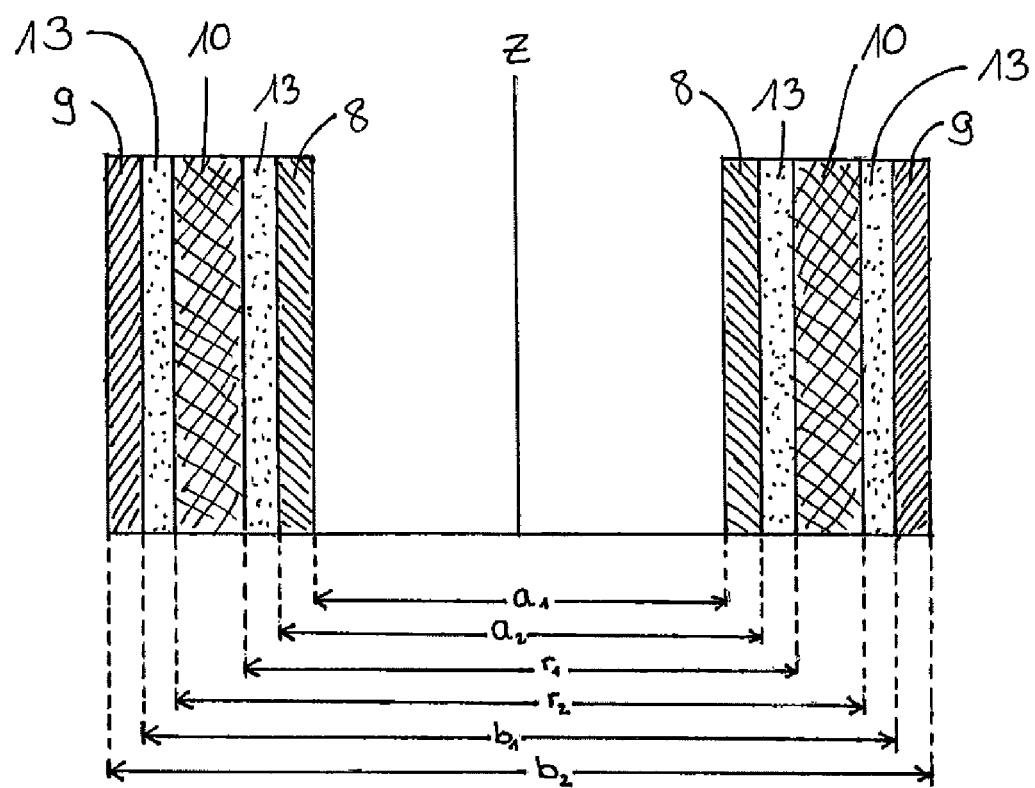
Figure 3A:
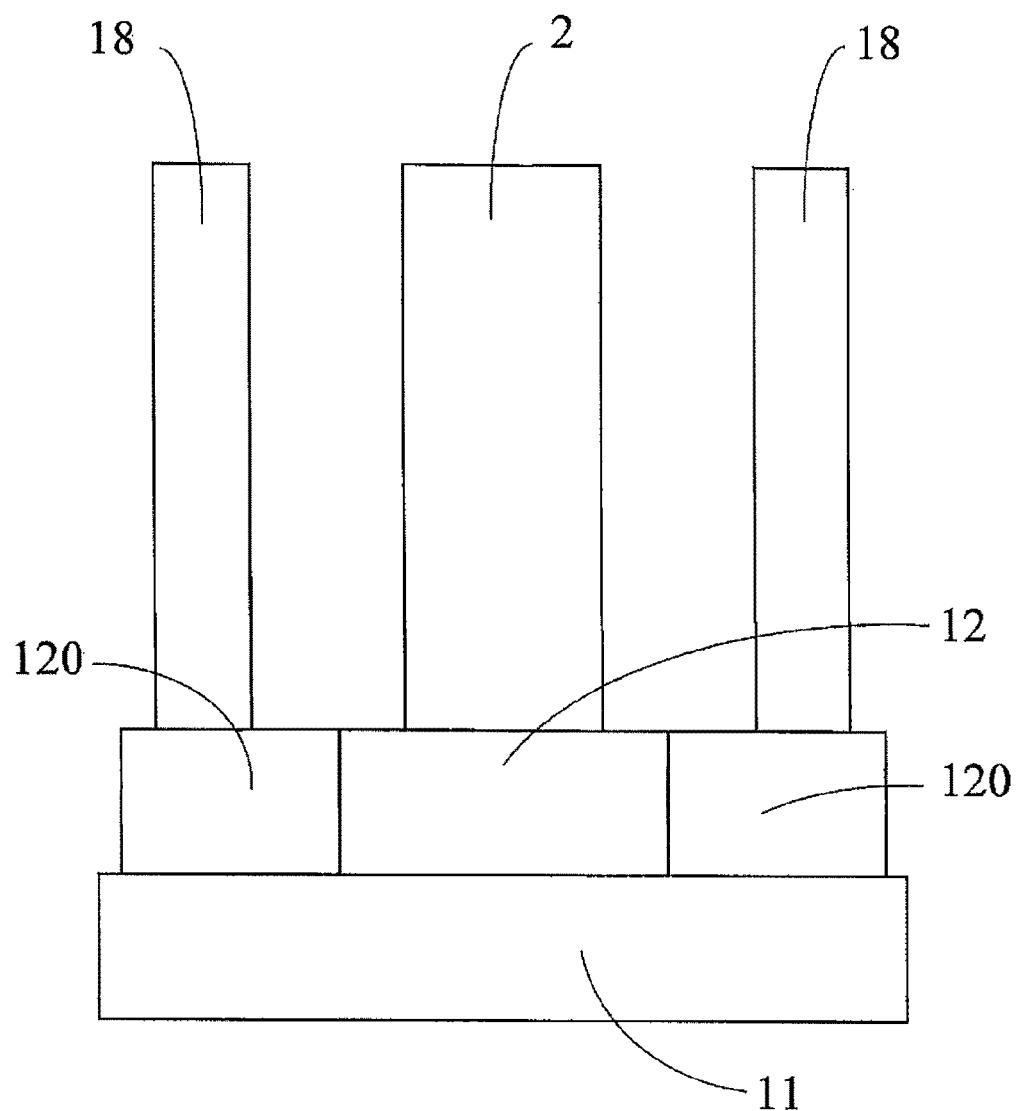
Figure 3B:
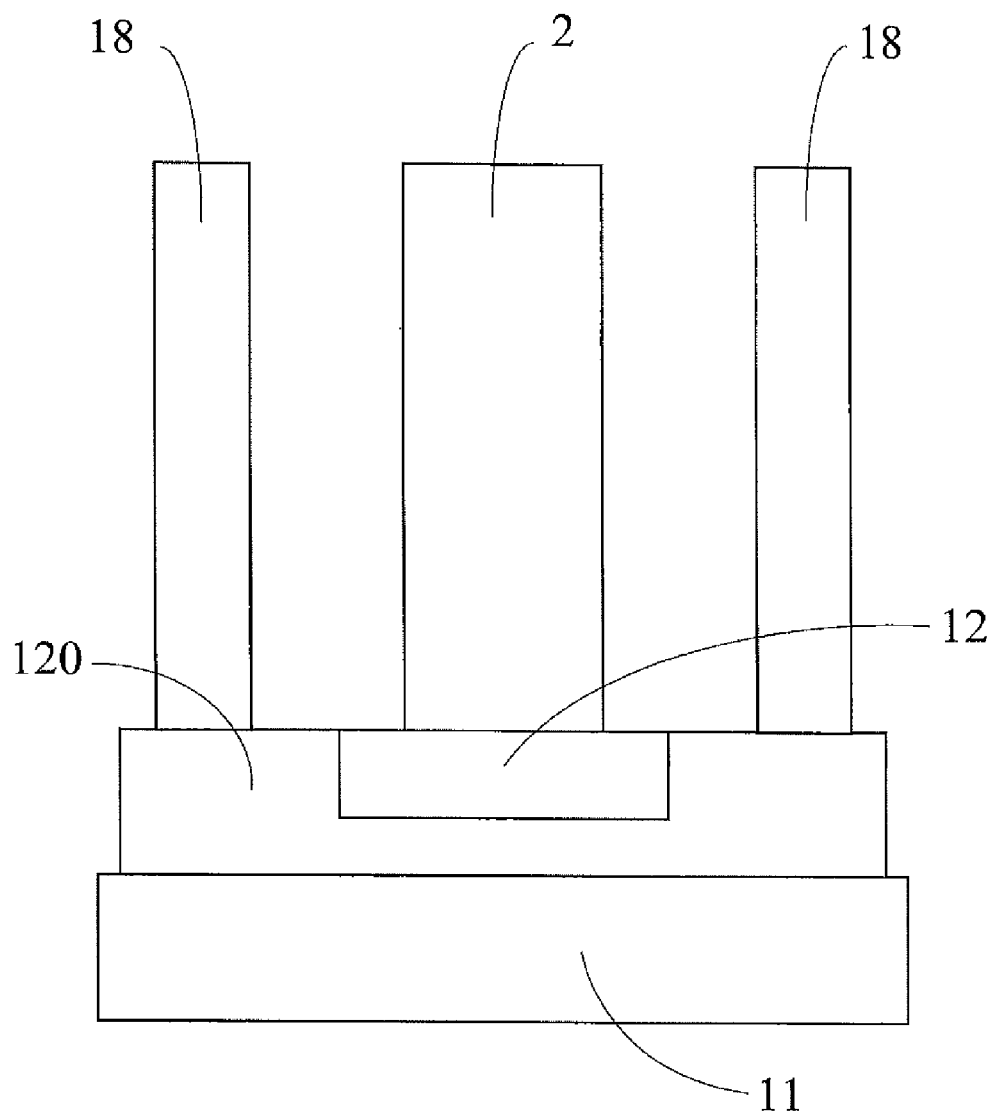

FIG. 1 shows a schematic view, partially in cross-section and partially in perspective, of a device for generatively manufacturing a three-dimensional object with a boundary region according to a first exemplary embodiment of the invention, FIGS. 2a and 2b show perspective and schematic depictions, respectively, of an object to be produced within the scope of carrying out an exemplary embodiment of the inventive method, FIGS. 3a and 3b show schematic views of a second exemplary embodiment of a building base in a device according to the invention, FIG. 4 shows a schematic view of a third exemplary embodiment of a building base in a device according to the invention, FIG. 5 is a schematic view of a further development of the boundary region within the scope of a further development of the method according to the invention.

Figure 6A:
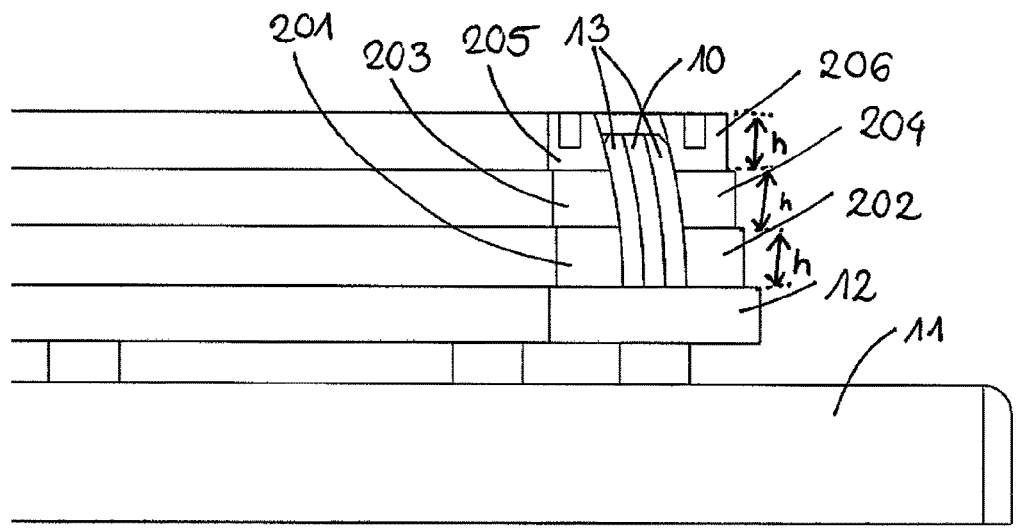
Figure 6B:
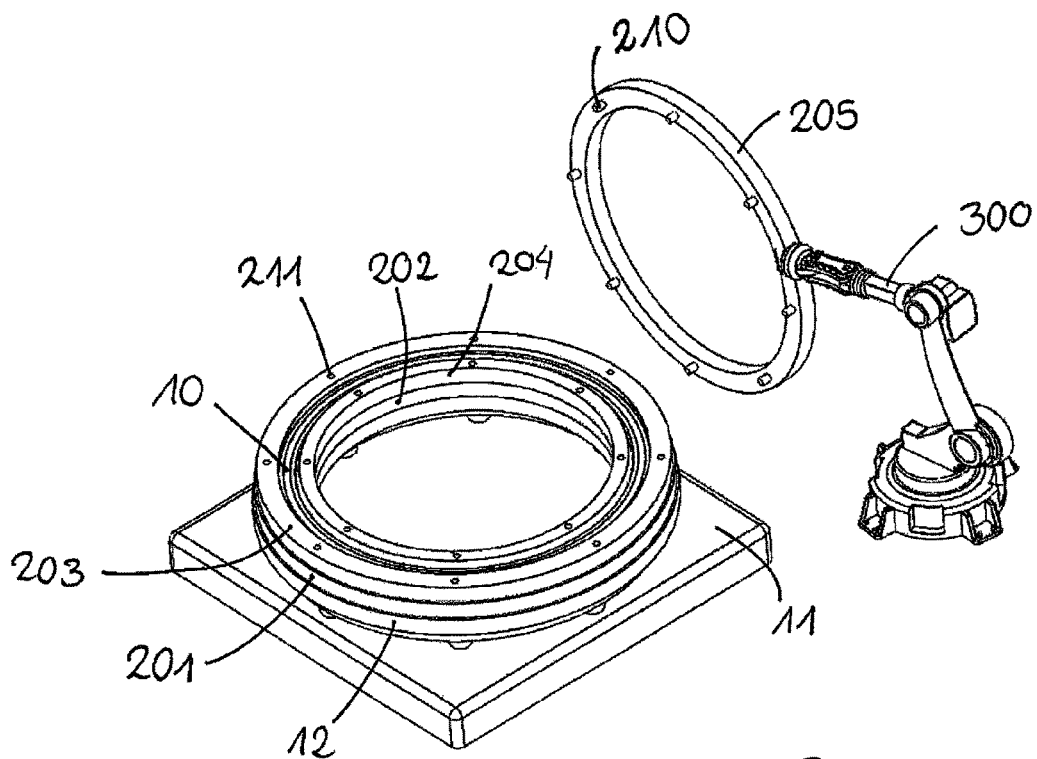

FIGS. 6a and 6b show schematic or perspective depictions of a second refinement of the boundary region within the scope of an exemplary embodiment of the method according to the invention.

Hereafter, a first exemplary embodiment according to the present invention is described with reference to FIG. 1. The device shown in FIG. 1 is a modified laser sintering or laser melting device.

A base plate 11 is provided as a building base for building an object 2 and a boundary region 18. Depending on the building material and process used, a building platform 12, on which the object 2 is built up, can also be applied on the base plate 11. However, the object 2 and the boundary region 18 can also be built on the base plate 11 itself, which then serves as the building base.

In FIG. 1, the object 2 to be formed on the building platform 12 is shown in an intermediate state with several solidified layers, surrounded by first building material 13 that remained unsolidified. The boundary region 18 is formed around the object 2 with the result that it defines a space in which the object 2 to be built and the first building material 13 that has remained unsolidified surrounding it are located. The space defined by the boundary region 18 is closed at the bottom by the building platform 12. Thus, the boundary region 18 substantially encloses the object 2 to be built completely in the x- and y- direction, wherein the x-y-plane is defined as a plane parallel to the (selectively) solidified layers. The z-direction of the Cartesian coordinate system is thus defined as the direction in which the building process proceeds. Preferably, the x-y-plane extends substantially in the horizontal plane, whereas the z-direction is substantially the vertical direction.

The device 1 further comprises a first storage container, which is not specifically shown in FIG. 1, for a first building material in powder form which can be solidified through electromagnetic radiation and a first application device 16 for application of the first building material on the building platform 12 or on an already previously applied layer of the first building material. The first application device 16 is arranged in the device 1 in such a manner that it is movable in the x-y-plane parallel to the layers as well as in the z-direction. The storage container, which is not shown, can also be movably arranged in the device 1 and/or integrally formed with the application device 16.

The device 1 further comprises an irradiation device 20 with a laser 21 which produces a laser beam 22 which is deflected by a deflection device 23 and focused by way of a focusing device 24 upon an applied layer of the first building material. With this, the irradiation device 20 can be developed and/or arranged in the modified laser sintering device 1 in such a way that the laser beam can be deflected and focused upon all positions of the cross-section of the object that are to be irradiated in each layer. Alternatively, the irradiation device 20 can also be arranged in the device 1 so as to be movable in z-direction and/or within a plane parallel to the x-y-plane.

Optionally, the device 1 comprises a first nozzle 14 on a first side of the position at which the laser beam 22 impacts on the applied layer of the first building material, and a second nozzle 15 on the side of the impinging laser beam 22 opposite to the first nozzle 14. The nozzles 14, 15 are configured to produce a gas flow 19 at the solidifying position.

The device 1 further comprises a second storage container, which is not specifically shown in FIG. 1, for a second building material which cures upon cooling, such as a wax or a thermoplast or a thermoplastic elastomer. A second application device designed as a material discharge nozzle 116 is arranged in the device 1 for application of the second building material on the building platform 12 or on an already previously applied layer of the second building material. The material discharge nozzle 116 is arranged in the device 1 in such a manner that it is movable in the x-y-plane parallel to the layers as well as in the z-direction. The second storage container can also be movably arranged in the device 1 or integrally formed with the material discharge nozzle 116.

Furthermore, the modified laser sintering device 1 comprises a control unit 29 via which the individual components of the device 1 can be controlled in a coordinated manner in order to implement the building process. Alternatively, the control unit can also be partially or completely be arranged outside of the device. The control unit can comprise a CPU, the operation of which is controlled by a computer program (software). The computer program can be stored separately from the device on a storage medium from which it can be loaded into the device, in particular into the control unit.

During operation, in order to apply a layer of the second building material, the material discharge nozzle 116 moves across the positions corresponding to a cross-section of the boundary region 18 in the respective layer and thus applies second, moldable, e.g. heated, building material on the building base or on an already previously applied layer of the second building material. The applied layer of the second building material cures—for instance by subsequent cooling—and thus forms a cross-section of the boundary region 18. The material is applied preferably in an application plane which is parallel to the x-y-plane in such a way that an area in the application plane is defined by the applied layer, said area having a closed boundary and the boundary being formed by the applied layer of the second building material.

Subsequently, the application device 16 moves to the storage container and receives therefrom a quantity of the first building material sufficient for applying a layer. The application device then moves across the area bounded by the cured layer of the boundary region 18 and there applies a thin layer of the pulverulent building material onto the building base or a previously existing powder layer. Application takes place at least over the entire cross-section of the object 2 to be produced, preferably over the entire area bounded by the boundary region 18. The cross-section of the object 2 to be produced is then scanned by the laser beam 22 so that the pulverulent building material is partly or completely melted by the heat energy introduced by the radiation at positions corresponding to the cross-section of the object 2 to be produced. After cooling, the scanned positions are then present as a cross-section of the object in the respective layer.

During the solidification of the cross-section of the object, a horizontally directed gas flow 19 is optionally produced by the nozzles 14, 15 by a gas emerging from the nozzle 14 and being sucked by the nozzle 15. In doing so, the nozzles 14, 15 move at a side of the point of incidence of the laser beam 22 along with it over the applied layer so that byproducts of the process resulting from partial or complete melting of the powder, such as spatters, fumes and vapors, can be discharged from the solidification area by the gas flow 19.

With this, layer application of the first building material does not have to wait until the entire layer of the second building material has been completely applied and cured. Rather, layer application according to the first production method that builds the three-dimensional object 2 can already be started as soon as a first section of the applied layer of the second building material has cured. The material discharge nozzle 116 thus moves in the application plane and is followed at a certain distance by the application device 16, wherein said distance depends on the curing time of the applied layer of second building material, among other things. The laser beam 22 and the nozzles 14, 15 also follow the application device 16 in the application plane. In particular, solidification of the first building material can already be started before a complete layer of the first building material has been applied.

After applying and solidifying a layer of the boundary region 18 and the object 2 the material discharge nozzle 116, the application device 16, the nozzles 14, 15 and, if applicable, the irradiation device 20 are raised by a height corresponding to the desired layer thickness.

These steps are repeated until the object 2 and the boundary region 18 are completed. Subsequently, the object 2 is removed from the boundary region 18 and from the device 1.

With this, it is not mandatory that the layer thickness of a layer of the first and second building material is the same. Rather, an applied layer of the second building material can also be thicker than a layer of the first building material. In this case, a layer of the second building material is solidified at positions corresponding to the cross-section of the boundary region 18 and then a number of layers of the first building material are applied and each solidified at positions corresponding to the cross-section of the object 2, the number of layers of the first building material being selected such that an object region is produced which substantially corresponds to the dimension of the applied layer of the second building material perpendicular to the layer.

In the case of simple geometries of the object 2 such as the geometry shown in FIG. 2a, the boundary region 18 can simply be removed therefrom after the object 2 has been completed. However, to remove the boundary region 18 it can also be completely or partially destroyed, for example by mechanical separation (such as sawing, breaking, blasting) or dissolution of the limiting region by means of chemical processes.

As an object 2 to be produced, FIG. 2a shows a straight circular cylinder 10 open at the top and bottom, which is surrounded by pulverulent building material 13 that has remained unsolidified. The cylinder 10 and the first building material 13 that has remained unsolidified are located between two further circular cylinders 8, 9 which form the boundary region 18. The three circular cylinders 8, 9, 10 are arranged in such a way that their axes coincide in a straight line Z.

FIG. 2b shows a schematic view of a horizontal section through the circular cylinders 8, 9, 10 along the line A-A shown in FIG. 2a. The cylinders 8, 9 and 10 each have an inner diameter a1, b1 and r1, respectively, and an outer diameter a2, b2 and r2, respectively, where a1<a2<r1<r2<b1<b2. The thicknesses of the circular cylinders 8, 9, 10 is therefore a1-a2 or b1 b2 or r1-r2.

According to FIG. 2a, two material discharge nozzles 116, 117 are arranged in the device 1. During operation, the first material discharge nozzle 116 moves clockwise in the application plane along an annulus with the inner radius b1 and the outer radius b2 and there applies a layer of the second building material. The second material discharge nozzle 117 simultaneously moves parallel to the first material discharge nozzle 116 in the application plane in the clockwise direction along an annulus with the inner radius a1 and the outer radius a2 and there applies a layer of the second building material. As soon as the applied second building material has cured, the application device 16 applies a layer of the first pulverulent building material in the application plane between the annuli 8, 9 applied by the material discharge nozzles 116, 117. Then the applied powder layer is solidified in the area of an annulus with the inner radius r1 and the outer radius r2. The material discharge nozzles 116, 117, the application device 16, the irradiation device 20 and the nozzles 14, 15 thus move clockwise along concentric circles about the straight line Z. After a complete circle a layer of the annuli 8, 9, 10 is applied and solidified and the devices are moved upwards by the amount of the thickness of a layer. These steps are repeated until the object 2 and the boundary region 18 are completed. The devices can also move counterclockwise.

The boundary region 18 formed by the circular cylinders 8, 9 thus has a geometry which is adjusted to the cylinder to be built, i.e. the object 2 to be produced.

In a second embodiment of the building base according to FIGS. 3a and 3b, at least one second building platform 120 is mounted on the base plate 11 in addition to the building platform 12. FIG. 3a shows an embodiment with two second building platforms 120. However, according to FIG. 3b, a second building platform 120 with a recess into which the first building platform 12 is fitted can also be provided. The three-dimensional object 2 is produced on the building platform 12, and the boundary region 18 on the building platform or platforms 120. After the building process the completed three-dimensional object 2 and the boundary region 18 can be removed separately from the device 1 without prior detaching the object 2 and/or the boundary region 18 from the building platform 12 or 120, respectively.

In a third embodiment of the building base according to FIG. 4, channels 15 are provided in the building platform 12. In this case, the channels 15 establish a connection between the interior region and the exterior region of the boundary region 18. The opening of the channels 15 located inside the boundary region 18 is at least partially arranged in the region of the first building material that has remained unsolidified. The opening of the channel 15 located in the exterior region can be connected to a material suction device which is not shown in FIG. 4.

After completion of the three-dimensional object 2, the unsolidified powder 13 surrounding the object 2 is sucked out of the interior region of the boundary region 18 through the channels 15 and the completed object 2 is then removed from the device and/or from the boundary region 18.

Furthermore, the channels 15 shown in FIG. 4 can also be used for injecting a gas flow for removing the unsolidified powder 13 surrounding the completed object 2. Furthermore, a first number of channels can also be used as injection channels and a second number of channels can be used as suction channels.

The second and third embodiment of the building base can also be combined with one another. For example, channels 15 can be provided in the second building platform 120, or the channels 15 extend over the first building platform 12 and the second building platform 120. Furthermore, the base plate 11 can also have channels 15.

According to a further development of the invention shown in FIG. 5, the boundary region 18 can be closed to its top end after completion of the object 2. For this purpose, in the course of the second production method, a cover 118 is formed from the second building material on top of the boundary region 18, preferably with one or more layers of unsolidified powder between the uppermost layer of the completed object 2 and the cover 118. The completed object 2 and the powder 13 that has remained unsolidified surrounding it are thus located in a substantially completely closed enclosure. By detaching the building platform 12 from the base plate 11, the object 2 can be removed from the device 1 with the unsolidified powder 13 in the enclosure.

According to a further development of the invention shown in FIG. 6a, the boundary region can also be formed from layer segments 201, 202, 203, 204, 205, 206, the layer segments preferably being prefabricated. Analogously to FIGS. 2a and 2b, the object 2 to be produced is a circular cylinder 10, which is surrounded by pulverulent building material 13 that has remained unsolidified. The inner circular cylinder 8 of the boundary region shown in FIGS. 2a and 2b is formed by the segments 201, 203, 205 and the outer circular cylinder 9 by the segments 202, 204, 206. The segments are designed as rings having a height h, wherein said height h preferably corresponds to several, for example 10, 50 or 500, object layers. The individual segments can also have different heights.

For building the boundary region from layer segments, a robot arm 300 shown in FIG. 6b can be provided, for example. Said robot arm positions in each case an inner and an outer ring as an inner or outer boundary region. In FIG. 6b, the circular segments 201 and 203, and 202 and 204, respectively, have already been placed on each other. The robot arm 300 now places the segment 205 on the segment 203. The segment 206 is then placed on the segment 204 and a further region of the circular cylinder 10 is produced in the building space thus formed between the segments 205 and 206 until the current height level of the boundary region is reached exactly or approximately. As can be seen from FIG. 6b, the layer segment 205 has pins 210 at its bottom. These form a form-fitted connection with recesses 211 provided in the upper side of the layer segment 203.

The layer segments can also be connected to one another by another form-fitted connection or by a force-fitted connection. The connection is preferably designed detachably, so that the boundary region formed from the segments can be dismantled in a simple manner.

In the above-described embodiments the material discharge nozzle, the application device, the gas nozzles, and optionally the irradiation device are movably arranged in the device and are moved upwards during the building process along with the advance of the layers in a vertical direction and/or in a horizontal plane across a layer. However, it is also possible to arrange the building base on a vertically movable support and to lower it in a vertical direction during the building process along with the advance of the layers and/or to arrange the building base in a horizontal plane and move it horizontally below the material discharge nozzle, the application device, the gas nozzles and the irradiation device.

Further modifications of the device for producing a three-dimensional object and a boundary region are possible. Thus, the device may further comprise a processing chamber which is thermally and/or gas-tightly insulated to its exterior and in which the three-dimensional object is produced along with the boundary region.

The device can also be operated without the suction device formed by the gas nozzles.

It is also possible that only one application device and/or one irradiation device is provided in the device 1. A layer of the first and second building material are then applied with the same application device and/or solidified and/or selectively solidified with the same solidification device.

Furthermore, the device can also comprise a radiation heater, which serves to heat the applied building material to a working temperature. The radiation heater can be formed, for example, as an infrared heater.

Furthermore, after the object has been finished, the material suction direction can also remove the unsolidified first building material from the boundary region from above.

Even though the present invention has been described by way of a modified laser sintering or laser melting device, the first production method is not restricted to laser sintering or laser melting. The invention can be applied to any method of generatively producing a three-dimensional object by layer-wise applying and selectively solidifying a pulverulent or liquid building material.

The irradiation device used in the first production method can, for example, comprise one or more gas or solid-state lasers, or any other type of laser, e.g. laser diodes, in particular VCSEL (Vertical Cavity Surface Emitting Laser) or VECSEL (Vertical External Cavity Surface Emitting Laser), or an array of these lasers. In general, any device with which energy as electromagnetic radiation or particle radiation can be selectively introduced into a layer of the first building material can be used as irradiation device. Instead of a laser, for example, a different light source, an electron beam or any other source of energy or radiation source can be used which is suitable for solidifying the first building material. Instead of deflecting a beam, exposure using a movable array light source can also be used. Furthermore, the invention can also be applied to selective mask sintering using an extended light source and a mask, or high-speed sintering (HSS), in which a material is selectively applied on the first building material to increase or decrease the absorption of the radiation at the respective positions (absorption sintering or inhibition sintering, respectively) and then unselectively exposed at a large area or with a movable array light source.

Instead of applying energy, the selective solidification of the applied first building material can also take place through 3D printing, for example through the application of an adhesive. In general the invention relates to the generative production of an object in a first production process by layer-wise application and selectively solidification of a first building material irrespective of the manner in which the first building material is solidified.

Various materials can be used as the first building material, preferably powders, in particular metal powders, plastic powders, ceramic powders, sand, filled or mixed powders.

Moreover, using the first production method several objects can be produced simultaneously in the device.

Furthermore, the second manufacturing method can be a different one from the fused deposition modeling method described. The invention can be applied to any methods for generatively producing a boundary region by layer-wise applying and solidifying a second building material. Thereby preferably a second production method is applied which is capable of producing a boundary region without enclosure, i.e. the second production method is preferably a process for freely building.

The steps of applying and solidifying the second building material can be carried out integrally in one step, for example by selective melt application of a material that solidifies itself during or immediately following the application. Depending on the second building material used and the second production method, a second solidification device can also be provided for solidifying an applied layer of the second building material.

The first and second production methods differ in the step of applying a layer of the building material and/or in the step of solidifying the applied layer. At that, the first and second building materials may be identical. However, it is also possible to use a first and a second building material which is different from the first one, wherein the building materials differ, for example, in their chemical composition and/or in their particle size and/or in their particle size distribution and/or in their aggregate state and/or in their density. In general, the first and second building materials preferably have at least a chemical and/or physical property in which they are clearly unambiguously different.

The first and the second production method can be carried out simultaneously as described in the above embodiment, that is, the steps of applying and solidifying the first and second building materials occur simultaneously. However, it is also possible to carry out the two production methods at least temporarily simultaneously or alternately.

The invention claimed is:

1. A method for producing a three-dimensional object and a boundary region by layer-wise applying and solidifying of at least one building material,
   wherein the three-dimensional object is produced with a first generative production method on the basis of a first building material and the boundary region is produced with a second generative production method, which is different from the first generative production method, on the basis of a second building material,
   wherein the first generative production method comprises the steps:
   applying a layer of the first building material on a building base or on an already previously applied layer,
   selectively solidifying the applied layer at positions corresponding to the cross-section of the object in the respective layer and
   repeating the steps of applying and selectively solidifying until the object is completed, and
   wherein the first and the second generative production method are carried out such that the boundary region encloses the object at least partially.

2. The method according to claim 1, wherein the first generative production method differs from the second generative production method in that the application of the first and the second building material is carried out with different methods and/or the solidification of the first and the second building material is carried out with different methods.

3. The method according to claim 1, wherein the second generative production method comprises the steps:
   selectively applying a layer of the second building material on a building base or on a previously applied layer at positions corresponding to the cross-section of the boundary region in the respective layer,
   solidifying the applied layer and
   repeating the steps of selectively applying and solidifying until the boundary region is completed.

4. The method according to claim 1, wherein the first building material and the second building material are different.

5. The method according to claim 1, to wherein the first generative production method and the second generative production method are carried out at least temporarily simultaneously or alternately.

6. The method according to claim 1, wherein the first and the second generative production method are carried out such that the boundary region encloses the object substantially completely in at least two spatial directions, preferably in a layer-parallel x- and a layer-parallel y-direction.

7. The method according to claim 1, wherein the application of a layer of the first building material according to the first generative production method is carried out substantially exclusively in an area bounded by the boundary region.

8. The method according to claim 1, wherein, after completion, the three-dimensional object is removed from the boundary region and/or the boundary region is removed from the object.

9. The method according to claim 1, wherein the first generative production method comprises a powder bed-based method using a source of electromagnetic radiation or particle radiation and/or wherein the second generative production method comprises a non powder bed-based method, in particular a fused deposition modeling method.

10. The method according to claim 2, wherein the application of a layer of the first building material according to the first generative production method is carried out substantially exclusively in an area bounded by the boundary region.

* * * * *